United States Patent
Hyodo et al.

(10) Patent No.: US 12,344,770 B2
(45) Date of Patent: Jul. 1, 2025

(54) ADHESIVE FOR TENNIS BALL

(71) Applicant: SUMITOMO RUBBER INDUSTRIES, LTD., Kobe (JP)

(72) Inventors: Takehiko Hyodo, Kobe (JP); Yuko Kujirai, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 335 days.

(21) Appl. No.: 17/849,436

(22) Filed: Jun. 24, 2022

(65) Prior Publication Data

US 2023/0027197 A1    Jan. 26, 2023

(30) Foreign Application Priority Data

Jul. 14, 2021    (JP) .................. 2021-116340

(51) Int. Cl.
  *C09J 109/00*    (2006.01)
  *A63B 39/00*    (2006.01)
  *A63B 102/02*    (2015.01)

(52) U.S. Cl.
  CPC .............. *C09J 109/00* (2013.01); *A63B 39/00* (2013.01); *A63B 2102/02* (2015.10)

(58) Field of Classification Search
  None
  See application file for complete search history.

(56) References Cited

U.S. PATENT DOCUMENTS

2011/0218056 A1 *    9/2011    Sullivan ................. A63B 37/12
                                                   473/385
2020/0109318 A1    4/2020    Hyodo et al.

FOREIGN PATENT DOCUMENTS

| JP | 57-179265 A | 11/1982 |
| JP | 58-98372 A | 6/1983 |
| JP | 2004-148022 A | 5/2004 |
| JP | 2020-59838 A | 4/2020 |

OTHER PUBLICATIONS

English Machine Translation JP2020059838A Obtained Sep. 20, 2024 at: Espacenet—Bibliographic data (Year: 2020).*

* cited by examiner

*Primary Examiner* — Arrie L Reuther
*Assistant Examiner* — Devin Mitchell Darling
(74) *Attorney, Agent, or Firm* — Birch, Stewart, Kolasch & Birch, LLP

(57) ABSTRACT

An adhesive for a tennis ball includes base rubber. The base rubber contains, as a main component thereof, liquid rubber having a number average molecular weight of not less than 10,000. The adhesive has a shear viscosity of not greater than 2,000 Pa·s. A tennis ball includes a hollow core made of a rubber material. The core includes two hemispherical half cores. The two half cores are adhered to each other by using the adhesive for a tennis ball.

5 Claims, 2 Drawing Sheets

ADHESIVE FOR TENNIS BALL

CROSS-REFERENCE TO RELATED APPLICATION

This application claims priority to and the benefit of Japanese Patent Application No. 2021-116340, filed on Jul. 14, 2021, the entire disclosure of which is incorporated herein by reference.

BACKGROUND OF THE INVENTION

Field of the Invention

The present specification discloses an adhesive. More specifically, the present specification discloses an adhesive for use in producing tennis balls.

Description of the Related Art

A tennis ball includes a core made of a rubber material. The core is a hollow sphere. The core is formed by adhering two hemispherical half cores to each other. An adhesive is used for adhering the two half cores to each other. The outer surface of the core is covered with two pieces of dumbbell-shaped felt (also referred to as "melton"). The adhesive is used also for adhering the melton to the outer surface of the core. A seam portion is formed in a gap between the two pieces of the melton. Seam glue made of a rubber composition is used for forming the seam portion.

Conventionally, in light of affinity with the core made of a rubber material and also in light of adhesive strength, a solvent-based adhesive has been used, which is obtained by dissolving a rubber component, a vulcanizing agent, a vulcanization accelerator, etc., in an organic solvent such as naphtha. For example, Japanese Laid-Open Patent Application Publication No. 2004-148022 (Patent Literature 1) discloses solvent-based seam glue that is obtained by dissolving a rubber composition in an organic solvent such as naphtha. The rubber composition contains, for example, base rubber such as natural rubber, titanium oxide, and sulfur.

Normally, a solvent-based adhesive for use on rubber is obtained in a liquid form in the following manner: kneading solid rubber such as natural rubber together with a filler, a vulcanization accelerator, and so forth by a mixer to reduce the molecular weight of the solid rubber; and dissolving the resulting kneaded mixture in an organic solvent for liquefaction. A large amount of the organic solvent is necessary to dissolve the kneaded mixture in the organic solvent. Since the organic solvent is highly volatile, the viscosity of the adhesive gradually increases while the adhesive is in storage and while the adhesive is being used in adhering work. Therefore, such a solvent-based adhesive cannot be used in a stable manner. Moreover, in a work environment where the adhesive is used, a worker is exposed to the volatilizing solvent. Furthermore, reflecting the growing concern for the environment in recent years, there has been a demand for reduction in the use of volatile organic compounds (VOC).

For example, Japanese Laid-Open Patent Application Publication No. S57-179265 (Patent Literature 2) discloses a melton-seaming adhesive in which depolymerized natural rubber latex or synthetic rubber latex is used as a base material. Japanese Laid-Open Patent Application Publication No. S58-98372 (Patent Literature 3) proposes a melton dumbbell adhesive in which a high-temperature decomposing vulcanizing agent is blended with rubber latex. Japanese Laid-Open Patent Application Publication No. 2020-059838 (Patent Literature 4) proposes an aqueous adhesive containing rubber latex and a sulfenamide-based vulcanization accelerator. The aqueous adhesive is used for adhering the half cores to each other by vulcanization adhesion.

While tennis is being played, a tennis ball is hit repeatedly. If the tennis ball has a core that is obtained by using an adhesive having low adhesive strength, the core may get damaged as a result of being hit repeatedly. Thus, an adhesive having excellent adhesive strength is necessary for producing the core, which is required to have high durability.

As proposed in Patent Literatures 2 to 4, in the case of an adhesive whose main component is rubber latex, the usage amount of the organic solvent is reduced, and consequently, the load on the environment and the load on the worker are reduced. However, rubber latex contains a large amount of low-volatile moisture. For this reason, there are cases where, after the vulcanization adhesion, residual moisture in the cured adhesive affects the adhesive strength, causing degradation in the durability of the tennis ball.

It is the intention of the applicant to provide an adhesive that has excellent workability and that makes it possible to produce a tennis ball having excellent durability.

SUMMARY OF THE INVENTION

The applicant conducted diligent studies, and as a result of the studies, the applicant focused on the fact that by using liquid rubber, which has fluidity, instead of rubber latex, which contains a large amount of moisture, the aforementioned problem of residual moisture in an adhesive layer after the vulcanization adhesion can be avoided. Then, consequently, the applicant has completed an adhesive for a tennis ball, which is disclosed herein.

Specifically, an adhesive for a tennis ball disclosed in the present specification includes base rubber. The base rubber contains, as a main component thereof, liquid rubber having a number average molecular weight of not less than 10,000. The adhesive has a shear viscosity of not greater than 2,000 Pa·s.

The adhesive for a tennis ball has a suitable shear viscosity for being applied to a surface to be adhered at a working temperature. The adhesive contains substantially no organic solvent, which is highly volatile. This makes it possible to reduce the load on the work environment, and also, while the adhesive is in storage and while the adhesive is being used in adhering work, the adhesive can maintain its suitable shear viscosity for application. Moreover, high adhesive strength is obtained from the adhesive. A tennis ball that is obtained by using the adhesive to adhere two half cores of the core of the tennis ball to each other has excellent durability.

DESCRIPTION OF THE PREFERRED EMBODIMENTS

Figure 1:
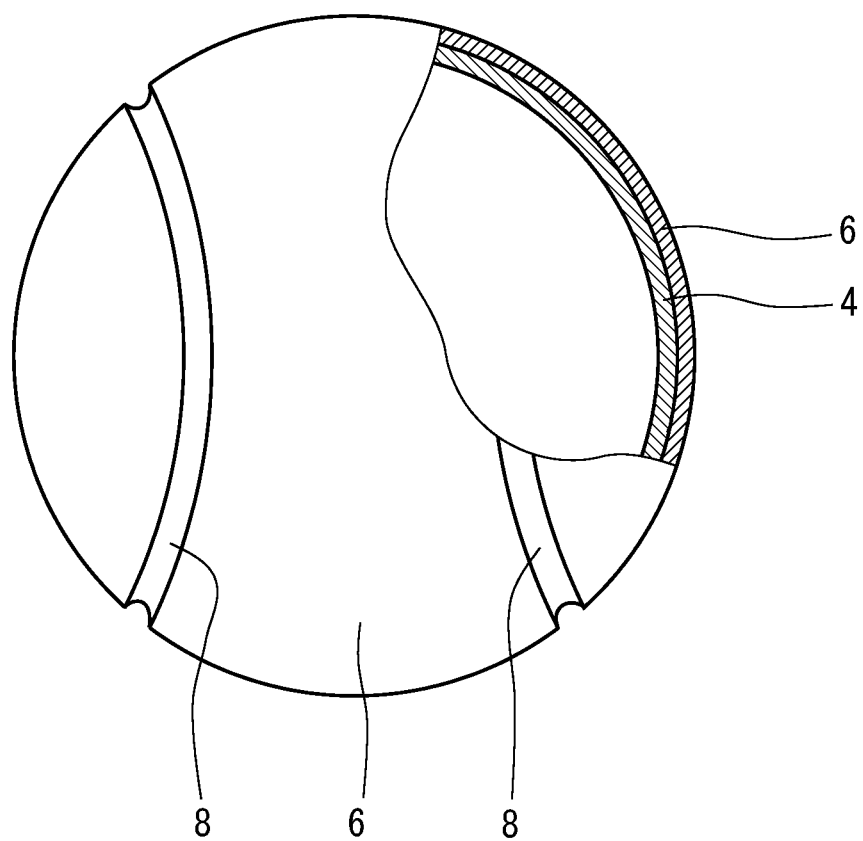
FIG. 1 is a partially cutaway cross-sectional view of a tennis ball that is obtained by using an adhesive according to one embodiment of the present disclosure.

Hereinafter, preferred embodiments of the present disclosure are described in detail with reference to the accompanying drawings as necessary. In the present specification, a range of "X to Y" means "not less than X and not greater than Y" Also, in the present specification, a test temperature is always a room temperature (20° C.±5° C.) unless otherwise specified.

An adhesive, for a tennis ball, according to one embodiment disclosed in the present specification contains base rubber. The base rubber contains, as a main component thereof, liquid rubber having a number average molecular weight of not less than 10,000. In the present specification, the term "liquid rubber" means rubber having fluidity at normal temperature under atmospheric pressure. Since the number average molecular weight of the liquid rubber serving as the main component of the base rubber is not less than 10,000, excellent adhesive strength suitable for adhering two half cores of a core 4 to each other is obtained.

The adhesive for a tennis ball has a shear viscosity of not greater than 2,000 Pa·s. Since the adhesive has a shear viscosity of not greater than 2,000 Pa·s, the adhesive has favorable application properties. The adhesive allows a worker to apply the adhesive uniformly in a suitable amount. Uniform application of the adhesive further improves the adhesive strength obtained from the adhesive. Moreover, no highly volatile organic solvent is used in the adhesive, and yet the shear viscosity of the adhesive is suitable for application. In other words, the adhesive contains substantially no organic solvent. This adhesive makes it possible to reduce the load on the environment as well as the load on the worker using the adhesive, and also, while the adhesive is in storage and while the adhesive is being used in adhering work, the adhesive can maintain its suitable shear viscosity for application.

In order to improve the workability of the adhesive, the ratio of the liquid rubber to the base rubber is preferably not less than 90% by mass, more preferably not less than 95% by mass, yet more preferably not less than 98% by mass, and particularly preferably not less than 99% by mass. The entire base rubber may be liquid rubber. The base rubber may contain solid rubber within such a range as not to inhibit the effects of the adhesive for a tennis ball. It should be noted that, in the present specification, the term "solid rubber" means rubber having no fluidity at normal temperature under atmospheric pressure.

In order to improve the adhesive strength, the number average molecular weight of the liquid rubber is preferably not less than 15,000, more preferably not less than 20,000, and yet more preferably not less than 26,000. In light of application properties, the number average molecular weight of the liquid rubber is preferably not greater than 60,000, and more preferably not greater than 40,000. The number average molecular weight of the liquid rubber is measured by gel permeation chromatography, and is calculated as a value expressed in terms of standard polystyrene.

In order to obtain favorable application properties, the shear viscosity of the adhesive is preferably not greater than 1,800 Pa·s, and more preferably not greater than 1,500 Pa·s. In order to achieve a suitable amount of adhesion of the adhesive to an application surface, the shear viscosity of the adhesive is preferably not less than 80 Pa·s, more preferably not less than 200 Pa·s, and particularly preferably not less than 500 Pa·s. It should be noted that the shear viscosity of the adhesive is measured at a temperature of 23° C. and a shear rate of 10 (l/s) by using a known rheometer.

The liquid rubber is not particularly limited to a specific kind of liquid rubber, so long as the effects of the adhesive for a tennis ball can be obtained. Examples of the liquid rubber include isoprene rubber, butadiene rubber, styrene-butadiene rubber, acrylonitrile-butadiene rubber, chloroprene rubber, isobutylene-isoprene rubber, ethylene-propylene rubber, and modified products thereof. Examples of the modified products include rubber modified with a functional group, such as a carboxyl group, an amine group, or a hydroxyl group. The liquid rubber is preferably isoprene rubber or butadiene rubber.

Preferably, the adhesive for a tennis ball contains a vulcanization accelerator in addition to the base rubber. The vulcanization accelerator is not particularly limited to a specific kind of vulcanization accelerator, so long as the effects of the adhesive are not inhibited. The vulcanization accelerator can be suitably selected for use from among, for example, aldehyde-ammonia-based vulcanization accelerators, aldehyde-amine-based vulcanization accelerators, thiazole-based vulcanization accelerators, sulfenamide-based vulcanization accelerators, thiuram-based vulcanization accelerators, dithiocarbamate-based vulcanization accelerators, guanidine-based vulcanization accelerators, thiourea-based vulcanization accelerators, and xanthate-based vulcanization accelerators. One of these vulcanization accelerators may be used, or two or more of these vulcanization accelerators may be used in combination. Preferably, the adhesive for a tennis ball contains a vulcanization accelerator selected from among sulfenamide-based vulcanization accelerators and guanidine-based vulcanization accelerators.

In order to achieve an appropriate cure rate and high adhesive strength, the amount of the vulcanization accelerator contained in the adhesive is preferably not less than 1.5 parts by mass, and more preferably not less than 2.5 parts by mass, with respect to 100 parts by mass of the base rubber. In light of fluidity during vulcanization, the amount of the vulcanization accelerator contained in the adhesive is preferably not greater than 5.0 parts by mass, and more preferably not greater than 4.0 parts by mass, with respect to 100 parts by mass of the base rubber.

The adhesive for a tennis ball may contain a vulcanizing agent as necessary. Preferable examples of the vulcanizing agent include: sulfur such as powdery sulfur, insoluble sulfur, precipitated sulfur, and colloidal sulfur; and sulfur compounds such as morpholine disulfide and alkylphenol disulfide.

The adhesive for a tennis ball may additionally contain a filler. One kind of filler, or two or more kinds of fillers, selected from the group consisting of carbon black, silica, calcium carbonate, calcium hydroxide, magnesium hydroxide, talc, mica, diatomaceous earth, titanium oxide, zinc oxide, bismuth oxide, barium sulfate, magnesium carbonate, and alumina is/are preferable. In light of adhesive strength, the amount of the filler in the adhesive is preferably not less than 1 part by mass, more preferably not less than 5 parts by mass, and particularly preferably not less than 10 parts by mass, with respect to 100 parts by mass of the base rubber. In light of fluidity, the amount of the filler in the adhesive is preferably not greater than 40 parts by mass with respect to 100 parts by mass of the base rubber.

The adhesive may further contain various additives, such as a vulcanization acceleration aid, a thickener, a tackifier, an anti-aging agent, an antioxidant, a light stabilizer, a softener, a processing aid, and a colorant, so long as the effects of the adhesive for a tennis ball are not inhibited.

A method of producing the adhesive for a tennis ball is not particularly limited. As one example, the adhesive may be produced by a method including: sequentially adding additives, such as a vulcanization accelerator, to base rubber that is liquid rubber having a number average molecular weight of not less than 10,000; and mixing them. The mixing can be performed by using a known kneader, such as a roll mill.

The adhesive for a tennis ball can be suitably used in the production of, for example, regulation tennis balls. FIG. 1 shows a tennis ball 2 obtained by using the adhesive according to one preferred embodiment. The tennis ball 2 includes: a hollow core 4 made of a rubber material; two felt portions 6 covering the core 4; and a seam portion 8 positioned in a gap between the two felt portions 6. In general, the thickness of the core 4 is about 3 mm to 4 mm. The inside of the core 4 is filled with compressed gas. The two felt portions 6 are adhered to the surface of the core 4 by the adhesive.

Figure 2A:
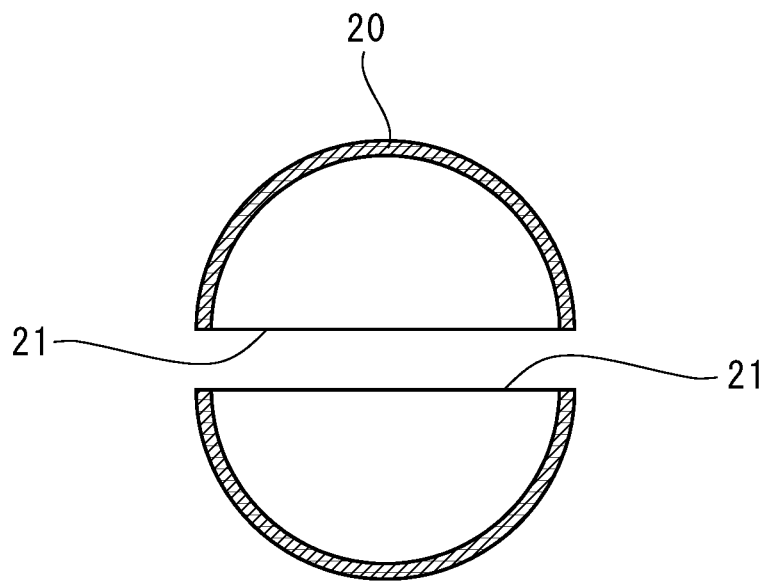
FIGS. 2A and 2B are each a cross-sectional view illustrating a step of forming the core of the tennis ball of FIG. 1.
Figure 2B:
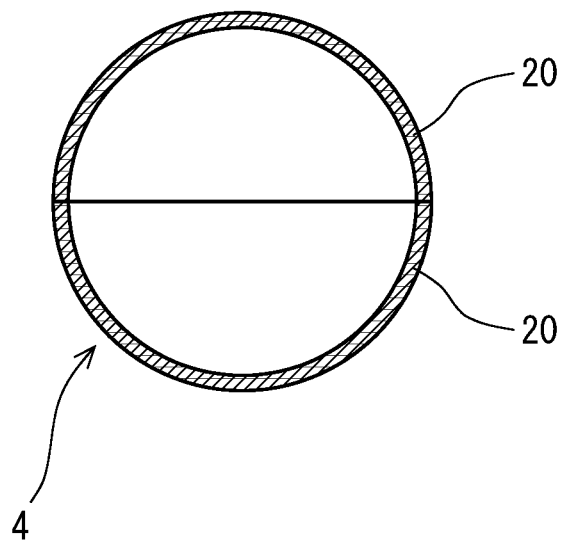

FIGS. 2A and 2B are each a cross-sectional view illustrating a step of forming the core 4 of the tennis ball 2 of FIG. 1. As shown in FIG. 2A, in the step of forming the core 4, first, two half cores 20 are prepared. Each of the half cores 20 is hemispherical-shell-shaped, and includes an annular edge portion 21. Next, the adhesive for a tennis ball is applied to the edge portion 21 of each half core 20, and water and tablets of sodium chloride and sodium nitrite are put into one of the half cores 20. Thereafter, as shown in FIG. 2B, the two half cores 20 are adhered to each other at their respective edge portions 21, and thereby a spherical body is formed. The spherical body formed by the two half cores 20 is put into a predetermined mold, heated and pressurized therein, and thereby the hollow core 4 is formed.

The core 4, which is made of a rubber material, is formed by crosslinking a rubber composition that contains, for example, base rubber, a vulcanizing agent, a vulcanization accelerator, and a filler. Preferable examples of the base rubber include natural rubber, polybutadiene, polyisoprene, styrene-butadiene copolymers, acrylonitrile-butadiene copolymers, polychloroprene, ethylene-propylene copolymers, ethylene-propylene-diene copolymers, isobutylene-isoprene copolymers, and acrylic rubber. As the base rubber, two or more kinds of these rubbers may be used in combination. The base rubber is more preferably natural rubber. The rubber composition for the core 4 may further contain additives, such as a vulcanization aid, an anti-aging agent, an antioxidant, a light stabilizer, a softener, a processing aid, and a colorant.

A method of producing the rubber composition for the core is not particularly limited, so long as the intention of the applicant is satisfied. For example, the rubber composition may be produced by a method including: putting and kneading the base rubber and suitably selected additives in a known kneading machine such as a Banbury mixer, a kneader, or a roll, thereby obtaining a kneaded mixture; and heating and pressurizing the kneaded mixture. Conditions for kneading and vulcanization are selected in accordance with the blending of the rubber composition. A preferable kneading temperature is not lower than 50° C. and not higher than 180° C. A preferable vulcanization temperature is not lower than 140° C. and not higher than 180° C. A preferable vulcanization time is not less than two minutes and not greater than 60 minutes.

A method of producing the tennis ball 2 including the core 4 obtained by using the rubber composition for the core is not particularly limited. For example, the adhesive is applied to the back surface of each of the felt portions 6, each of which has previously been cut into a dumbbell shape, and seam glue is applied to the cross-sectional surface of each felt portion 6. Then, these felt portions 6 with the adhesive and the seam glue applied thereto are adhered to the surface of the core 4, and thereby the tennis ball 2 is obtained. Before the felt portions 6 are adhered to the surface of the core 4, the adhesive may be applied to the surface of the core 4. A known adhesive may be suitably selected and used for the adhesion of the felt portions 6, and may be used as the seam glue.

The adhesive for a tennis ball has high adhesive strength. Moreover, since the adhesive has favorable workability, the adhesive in a suitable amount can be uniformly applied to the edge portion 21 of each half core 20. Uniform application of the adhesive further improves the adhesive strength of the core 4. The tennis ball 2 including the core 4 has high durability.

EXAMPLES

The following elucidates the effects of the adhesive for a tennis ball according to Examples. However, the scope of the disclosure in the present specification should not be restrictively construed based on the description of the Examples.

Example 1

100 parts by mass of liquid rubber (having a number average molecular weight of 28,000; trade name "LIR30" available from Kuraray Co., Ltd.), 20 parts by mass of carbon black (ISAF; trade name "SEAST 6" available from Tokai Carbon Co., Ltd.), 5 parts by mass of zinc oxide (trade name "GINREI R" available from Toho Zinc Co., Ltd.), 1 part by mass of stearic acid (trade name "STEARIC ACID CAMELLIA" available from NOF CORPORATION), 5.26 parts by mass of sulfur (sulfur containing 5% of oil; trade name "5% OIL TREATED SULFUR POWDER (200 mesh)" available from Tsurumi Chemical Industry Co., Ltd.), 1.50 parts by mass of a vulcanization accelerator CBS (N-cyclohexyl-2-benzothiazolyl sulfenamide; trade name "NOCCELER CZ-G" available from OUCHI SHINKO CHEMICAL INDUSTRIAL CO., LTD.), and 1.74 parts by mass of a vulcanization accelerator DPG (1,3-Diphenylguanidine, trade name "NOCCELER D" available from OUCHI SHINKO CHEMICAL INDUSTRIAL CO., LTD.) were put into a three-roll mill, and kneaded therein at 35 to 40° C. for 0.5 hours. In this manner, an adhesive of Example 1 was obtained.

Examples 2 to 5 and Comparative Examples 1 to 2

Adhesives of Examples 2 to 5 and Comparative Examples 1 to 2 were obtained in the same manner as in Example 1 except that the blending ratios of the base rubber and the additives were changed as shown in Tables 1 and 2 below.
[Measurement of Shear Viscosity]

The shear viscosity of the adhesive of each of Examples 1 to 5 and Comparative Examples 1 to 2 was measured at a temperature of 23° C. and a shear rate of 10 (1/s) by using a rheometer (available from Anton Paar GmbH). The measurement results are shown in Tables 1 and 2 below.
[Evaluation of Durability]

100 parts by mass of natural rubber (trade name "SMR CV60" available from Astlett Rubber Inc.), 15 parts by mass of carbon black (trade name "N330" available from Cabot Japan K.K.), 4 parts by mass of silica (trade name "Nipsil VN3" available from Tosoh Silica Corporation), 30 parts by mass of kaolin clay (trade name "ECKALITE 120" available from Imerys S.A.), 17 parts by mass of magnesium carbonate (trade name "KINBOSHI" available from Konoshima Chemical Co., Ltd.), and 5 parts by mass of zinc oxide (trade name "Zinc Oxide II" available from SEIDO CHEMICAL INDUSTRY CO., LTD.) were put into a kneader, kneaded therein at 90° C. for 5 minutes, and thereby a kneaded mixture was obtained. To the kneaded mixture, the following additives were added: 0.5 parts by mass of salicylic acid (available from Tokyo Chemical Industry Co., Ltd.); 2.3 parts by mass of 1,3-Diphenylguanidine (trade name "SANCELER D" available from SANSHIN CHEMICAL INDUSTRY CO., LTD.); and 3.5 parts by mass of sulfur (trade name "SANFEL EX" available from SANSHIN CHEMICAL INDUSTRY CO., LTD.). The mixture was kneaded with these additives at 50° C. for 3 minutes by using an open roll, and thereby a rubber composition was obtained.

The obtained rubber composition was put into a mold, heated and pressurized therein at 150° C. for 4 minutes, and thereby two half cores (each having a thickness of 3.2 mm±0.4 mm) were formed. The edge portion of each half core was sandpapered (#100). Thereafter, the adhesive of Example 1 was applied to the edge portion of each half core, which was then dried at room temperature for two hours or more. Then, ammonium chloride, sodium nitrite, and water were put into one of the half cores. Subsequently, the one half core was adhered to the other half core, and the half cores thus adhered to each other were heated at 150° C. for 6 minutes, and thereby a test core was prepared. Other test cores were also prepared in the same manner except that, for each of the other test cores, a corresponding one of the adhesives of Examples 2 to 5 and Comparative Examples 1 to 2 was used instead of the adhesive of Example 1.

Each test core thus obtained was repeatedly brought into collision against a metal wall from a distance of 1 meter at a speed of 50 m/s, and how many times each test core was brought into the collision until the test core was broken was measured. Ten pieces of each test core were prepared. The measurement was performed on each of the ten pieces of the test core, and the average measurement value for the ten pieces was calculated. The calculation results are shown in Tables 1 and 2 below.

[Evaluation of Workability]

During the above-described preparation of each test core, at the time of applying a corresponding one of the adhesives of Examples 1 to 5 and Comparative Examples 1 to 2 to the edge portions of the test core, ten workers made sensory evaluation on workability (the degree of ease of application of the adhesive and the odor of the adhesive) based on three grades A, B, and C. The highest workability was evaluated as "A" and the lowest workability was evaluated as "C." Points were given such that A=5 points, B=3 points, and C=1 point. The average of the points given to each adhesive was calculated, and the calculation results are shown in Tables 1 and 2 below.

TABLE 1

|  | Ex. 1 | Ex. 2 | Ex. 3 | Ex. 4 | Comp. Ex. 1 |
|---|---|---|---|---|---|
| LIR30 (Mn28000) | 100.00 | 90.00 | 70.00 | 50.00 | 30.00 |
| LIR50 (Mn54000) | 0 | 10.00 | 30.00 | 50.00 | 70.00 |
| ISAF | 20.00 | 20.00 | 20.00 | 20.00 | 20.00 |
| ZnO | 5.00 | 5.00 | 5.00 | 5.00 | 5.00 |
| Stearic acid | 1.00 | 1.00 | 1.00 | 1.00 | 1.00 |
| Sulfur | 5.26 | 5.26 | 5.26 | 5.26 | 5.26 |
| CBS | 1.50 | 1.50 | 1.50 | 1.50 | 1.50 |
| DPG | 1.74 | 1.74 | 1.74 | 1.74 | 1.74 |
| Shear viscosity [Pa · s] | 743 | 995 | 1187 | 1777 | 2490 |
| Workability | 4.8 | 4.6 | 4.0 | 3.6 | 1.0 |
| Durability | 53 | 57 | 60 | 64 | 68 |

TABLE 2

|  | Ex. 5 | Comp. Ex 2 |
|---|---|---|
| LBR305 (Mn26000) | 100.00 | 0 |
| LBR352 (Mn9000) | 0 | 100.00 |
| ISAF | 20.00 | 20.00 |
| ZnO | 5.00 | 5.00 |
| Stearic acid | 1.00 | 1.00 |
| Sulfur | 5.26 | 5.26 |
| CBS | 1.50 | 1.50 |
| DPG | 1.74 | 1.74 |
| Shear viscosity [Pa · s] | 423 | 71 |
| Workability | 5.0 | 1.0 |
| Durability | 49 | 1 |

The details of the compounds indicated in Tables 1 and 2 are as follows.

LIR30: liquid polyisoprene rubber (having a number average molecular weight of 28,000) available from Kuraray Co., Ltd.

LIR50: liquid polyisoprene rubber (having a number average molecular weight of 54,000) available from Kuraray Co., Ltd.

LBR305: liquid polybutadiene rubber (having a number average molecular weight of 26,000) available from Kuraray Co., Ltd.

LBR352: liquid polybutadiene rubber (having a number average molecular weight of 9,000) available from Kuraray Co., Ltd.

ISAF: carbon black; trade name "SEAST 6" available from Tokai Carbon Co., Ltd.

ZnO: zinc oxide; trade name "GINREI R" available from Toho Zinc Co., Ltd.

Stearic acid: trade name "STEARIC ACID CAMELLIA" available from NOF CORPORATION

Sulfur: sulfur containing 5% of oil; trade name "5% OIL TREATED SULFUR POWDER (200 mesh)" available from Tsurumi Chemical Industry Co., Ltd.

CBS: N-CYCLOHEXYL-2-BENZOTHIAZOLYL SULFENAMIDE; trade name "NOCCELER CZ-G" available from OUCHI SHINKO CHEMICAL INDUSTRIAL CO., LTD.

DPG: 1,3-Diphenylguanidine; trade name "NOCCELER D" available from OUCHI SHINKO CHEMICAL INDUSTRIAL CO., LTD.

As shown in Tables 1 and 2, evaluations for the adhesives of the Examples were higher than evaluations for the adhesives of the Comparative Examples. These evaluation results clearly indicate the superiority of the adhesive for a tennis ball of the present disclosure.

[Disclosure Items]

The following items each disclose a preferred embodiment.

[Item 1]

An adhesive for a tennis ball, including base rubber, wherein the base rubber contains, as a main component thereof, liquid rubber having a number average molecular weight of not less than 10,000, and the adhesive has a shear viscosity of not greater than 2,000 Pa·s.

[Item 2]

The adhesive for a tennis ball according to Item 1, wherein the liquid rubber is isoprene rubber or butadiene rubber.

[Item 3]

The adhesive for a tennis ball according to Item 1 or 2, further including a vulcanization accelerator, wherein an amount of the vulcanization accelerator in the adhesive is not less than 1.5 parts by mass and not greater than 5.0 parts by mass with respect to 100 parts by mass of the base rubber.

[Item 4]

A tennis ball including a hollow core made of a rubber material, wherein the core includes two hemispherical half cores, and the two half cores are adhered to each other by using the adhesive according to any one of Items 1 to 3.

The above-described adhesive for a tennis ball is applicable to the production of various rubber products. The foregoing description is in all aspects illustrative, and various modifications can be made without departing from the essential features disclosed in the present specification.

What is claimed is:

1. A tennis ball comprising a hollow core made of a rubber material, wherein
    the core includes two hemispherical half cores, and
    the two half cores are adhered to each other by using an adhesive,
    the adhesive comprises a base rubber containing, as a main component thereof, a liquid rubber having a number average molecular weight of not less than 10,000,
    the ratio of the liquid rubber to the base rubber is not less than 90% by mass, and
    the adhesive has a shear viscosity of not less than 80 Pa·s and not greater than 2,000 Pa·s.

2. The tennis ball according to claim 1, wherein the liquid rubber is isoprene rubber or butadiene rubber.

3. The tennis ball according to claim 2, wherein
    the adhesive further comprises a vulcanization accelerator, and
    an amount of the vulcanization accelerator in the adhesive is not less than 1.5 parts by mass and not greater than 5.0 parts by mass with respect to 100 parts by mass of the base rubber.

4. The tennis ball according to claim 1, wherein
    the adhesive further comprises a vulcanization accelerator, and
    an amount of the vulcanization accelerator in the adhesive is not less than 1.5 parts by mass and not greater than 5.0 parts by mass with respect to 100 parts by mass of the base rubber.

5. The tennis ball according to claim 1, wherein the liquid rubber has a number average molecular weight of not less than 10,000 and not more than 60,000.

* * * * *